Aug. 25, 1959 L. Y. BOOHARIN 2,901,021
TIRE AND WHEEL CONSTRUCTION
Filed Sept. 27, 1956

INVENTOR.
LEO Y. BOOHARIN
BY Alexander Riaboff
ATTORNEY

United States Patent Office 2,901,021
Patented Aug. 25, 1959

2,901,021

TIRE AND WHEEL CONSTRUCTION

Leo Y. Booharin, San Francisco, Calif., assignor of thirty percent to Casimir David, and thirty percent to Morris Katz, both of San Francisco, Calif.

Application September 27, 1956, Serial No. 612,503

4 Claims. (Cl. 152—334)

This invention relates to a sectional tire and wheel construction.

The object of this invention is to provide a tire consisting of a plurality of separately inflated tire sections radially arranged on the circumference of a wheel, which sections when inflated form an interrupted tire surface.

Another object of this invention is to provide a tire of the type described in which each section may be deflated and separately removed and replaced by another one.

Another object of this invention is to provide a special wheel which securely holds said tire sections in place and proper alignment.

Other objects and advantages will appear as the specification proceeds and the novel features of the device will be particularly pointed out in the claims hereto annexed.

In this specification and the annexed drawing, the invention is illustrated in the form considered to be the best but it is understood that the invention is not limited to such form; and it is also to be understood that in and by the claims following the description, it is desired to cover the invention in whatsoever form it may be embodied.

Figure 1:
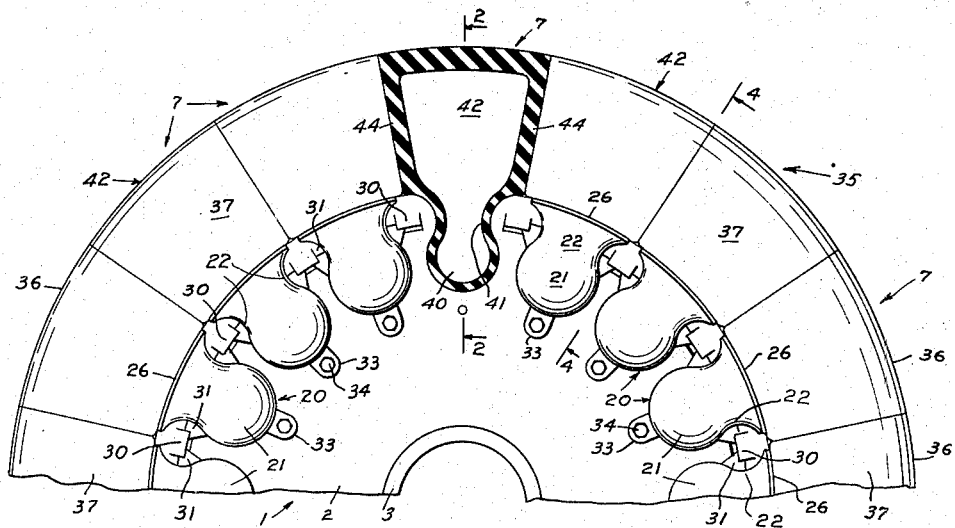
Fig. 1 is a partial side view of the wheel and the tire, some parts being shown in sections.

In detail my wheel 1 consists of a disk 2 having a hub 3 in the center through which an axle passes. A plurality of radially arranged sockets 5 each holding a tire section 7 is provided on the periphery of the wheel 1. Each socket 5 consists of a hemispherical depression 8 which narrows into a neck 9 in direction away from the center of the wheel 1, and thereafter flares out into a substantially rectangular opening 10 defined by a rim 12. The latter consists of a central part 13 running parallel to the plane of the disk 2 and two side parts 14 and 15 running at the right angles to said part 13. The parts 14 and 15 of the two adjoining sockets 5 run parallel and are connected by a short disk rim 17.

Each socket 5 is closed by a separate retainer 20 which complements said socket and consists of a hemispherical depression 21, a neck portion 22 connected thereto, and a flared out opening 23 defined by a rim 25. Said retainer rim also consists of three parts: a central part 26 which runs parallel to the part 13 of the socket rim 12, and side parts 27 and 28 which serve as continuations of the parts 14 and 15 of the rim 12.

Each retainer 20 is secured to the disk 2 in the following manner: A tongue 30 is struck out of the disk near its periphery between the neck portions 9 of the adjoining sockets 5, while each retainer 20 is formed with a pair of ears 31 which are adapted to be slid under said tongues 30 and retained thereunder. A central ear 33 is provided at the bottom of each hemispherical depression 21. A bolt 34 is passed through said ear 33 and disk 2 and a nut 35 is applied on the other side of said disk to hold said retainer tightly and fixedly against said disk.

When it is desired to take one of the retainers 20 off, the bolt 34 is taken out, the bottom of the retainer 20 is swung away from the disk and the retainer 20 is pulled toward the center of the wheel to free the ears 31 from the engagement with the tongues 30.

Figures 2, 3:
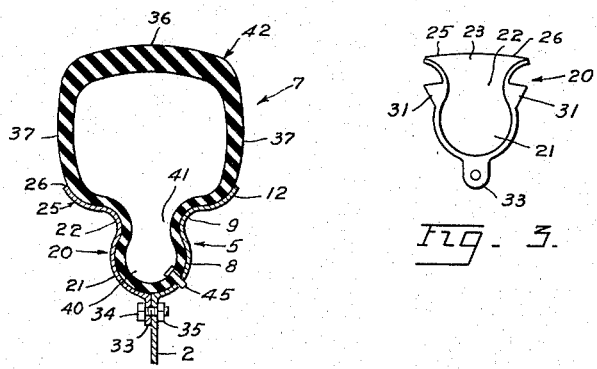
Fig. 2 is a vertical cross-section of the tire taken along the line 2—2 of Fig. 1.
Fig. 3 is a back side view of the retainer plate.
Figure 4:
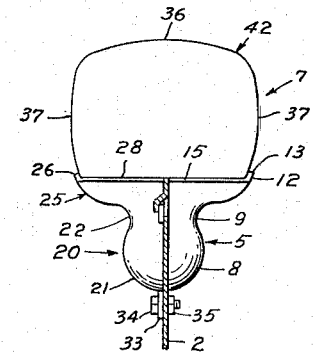
Fig. 4 is a vertical cross-section taken along the line 4—4 of Fig. 1.
Figures 5, 6:
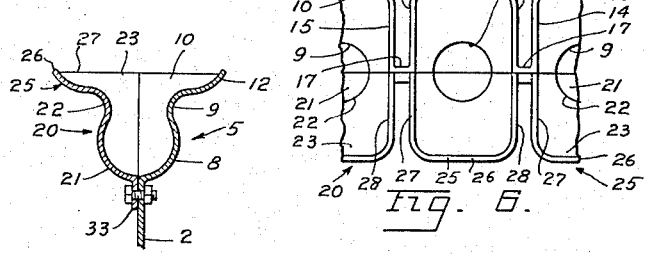
Fig. 5 is a vertical cross-section of the wheel taken along the line 2—2 of Fig. 1.
Fig. 6 is a partial end view of the wheel.

The tire sections 7, when assembled on the wheel 1 and inflated, comprise a tire 35 which has an uninterrupted, continuous peripheral working surface 36 and smooth uninterrupted side walls 37 of a usual configuration of an ordinary tire. Each tire section 7 consists of an anchoring unit in form of a hollow sphere 40, a neck 41 extending therefrom and a tire unit 42. The sphere 40 and the neck 41 fit tightly into the respective hemispherical depression 8 and the neck 9 of the wheel 1 and are held firmly in place by the corresponding parts of the retainer 20. The tire unit 42 is defined by two slightly converging end walls 44 which are formed radially and at the right angles to the disk 2, the top 36 and the side walls 37, so that the tire unit has a cross-sectional configuration of an ordinary tire, as shown in Figs. 2 and 4. The adjoining tire sections 7 abut each other by the end walls 44, each section, when inflated, fitting tightly between two adjoining sections.

Each section is inflated through an individual usual air valve 45. When each section 7 is fully inflated, the tire becomes sufficiently rigid to represent an interrupted and continuous surface of an ordinary tire. Each section is securely anchored by its sphere 40 in the depression 8 closed by the retainer 20.

The disk rims 12, in cooperation with the socket rims 25, provide transverse support for the tire sections 7, keep said sections in perfect alignment, and serve as supports for the tire units when pressure is applied on said units.

If one of the sections 7 is deflated by a puncture or is blown out, the tire as a whole continues to function, thus preventing an accident to a vehicle, such as an airplane, or an automobile. The deflated section can be easily substituted by a new one and inflated.

Having thus described my invention, I claim:

1. A wheel and tire construction comprising a plurality of tire sections, each having an anchoring unit in form of a hollow sphere, and a hollow tire unit having a top, sides and two end walls, said tire units forming a tire proper with an uninterrupted continuous circumferential surface and sides; a disk having a plurality of sockets in the periphery thereof, each socket being formed with a hemispherical depression to admit the sphere of the tire section; and a neck extending from said socket and being flared out to form substantially a rectangular rim for supporting the tire unit; and retainers for closing each socket and locking the sphere therein, each of said retainers being formed with hemispherical and neck depressions and each having a flared out rim to complement the disk rim.

2. A wheel and tire construction comprising a plurality of tire sections, each having an anchoring unit in form of a hollow sphere, a hollow tire unit and a neck connecting said units; said tire unit consisting of a top, sides and two end walls, said tire units forming the tire proper with an uninterrupted continuous circumferential surface and sides; a disk, a plurality of sockets formed radially in the periphery of the disk, each of said sockets being formed with a hemispherical depression, a neck extending therefrom and being flared out to form substantially a rectangular rim for supporting the tire unit; and a retainer for closing each of said sockets and locking the spheres therein, said retainer being formed with hemispherical and neck depressions and each having a flared out rim to complement the corresponding parts of the sockets.

3. A wheel for a sectional tire comprising a disk, a plurality of radial sockets, each socket being formed with a hemispherical depression and a neck extending therefrom and being flared out to form a substantially rectangular rim, and a retainer for each socket, each retainer having hemispherical and neck depressions and a flared out rim to complement the corresponding parts of the socket.

4. A wheel and tire construction comprising a plurality of tire sections forming an uninterrupted continuous circumferential surface and sides, each section consisting of a hollow tire unit and an anchoring unit integral therewith in form of a hollow sphere connected to the tire unit by a neck, a wheel for carrying said tire sections consisting of a disk having a plurality of sockets radially and equidistantly arranged on the periphery thereof, each socket being formed with a hemispherical depression, to admit said sphere, and a neck and being flared out to form a substantially rectangular rim for supporting the tire unit; and a plurality of retainers for closing said sockets and locking the sphere therein, and means for holding said retainers securely on said disk.

References Cited in the file of this patent

UNITED STATES PATENTS

| | | |
|---|---|---|
| 567,521 | Tibbitt | Sept. 8, 1896 |
| 1,845,583 | Des Rosiers | Feb. 16, 1932 |
| 2,143,471 | Booharin | Jan. 10, 1939 |

FOREIGN PATENTS

| | | |
|---|---|---|
| 8,523 | Great Britain | of 1896 |